Sept. 10, 1957  A. W. GARDES  2,806,101
ELECTRIC STEERING GEAR BOOSTER SWITCH
Filed Dec. 14, 1953  4 Sheets-Sheet 1
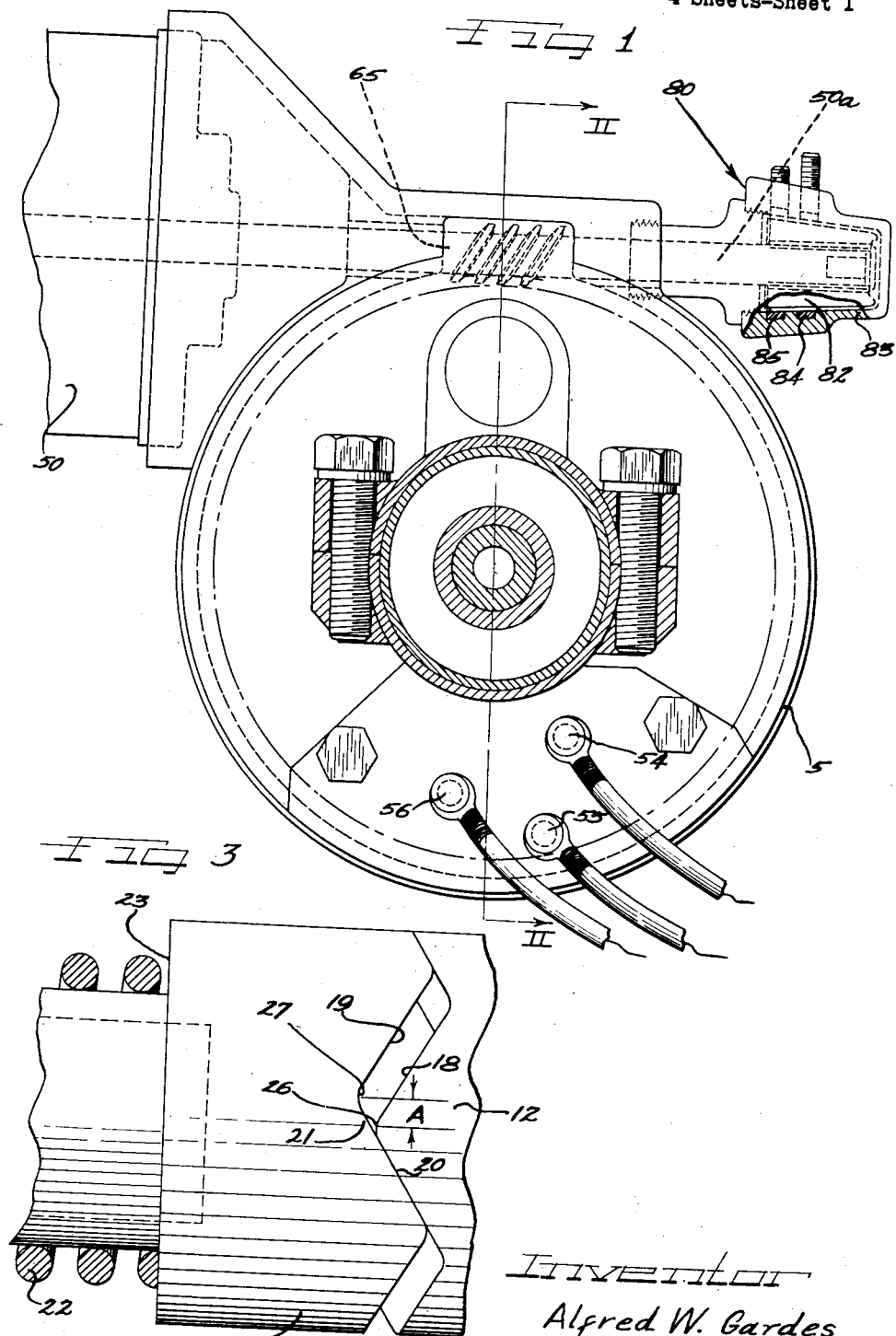
Inventor
Alfred W. Gardes Sept 10, 1957  A. W. GARDES  2,806,101
ELECTRIC STEERING GEAR BOOSTER SWITCH
Filed Dec. 14, 1953  4 Sheets-Sheet 2
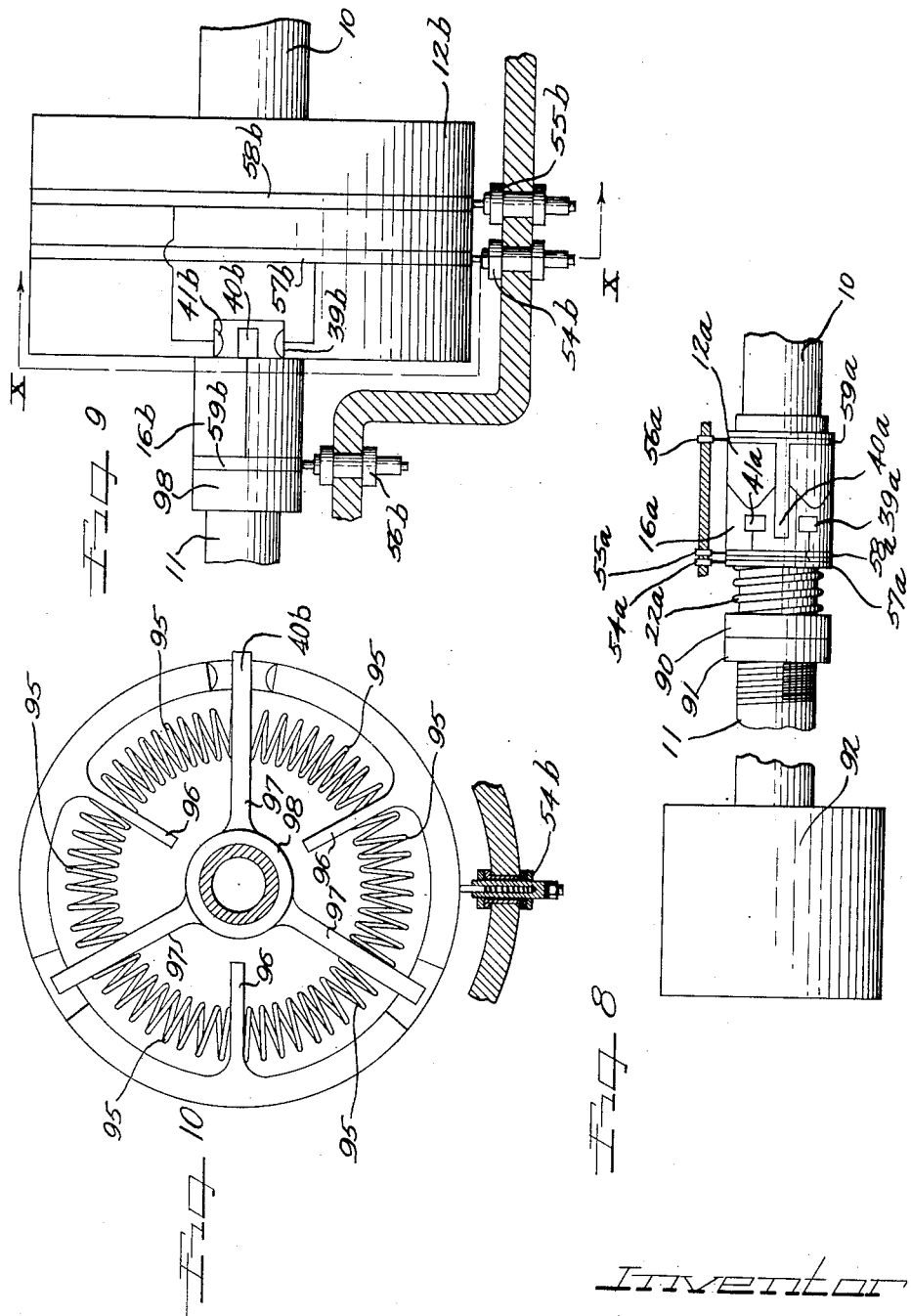
Inventor
Alfred W. Gardes

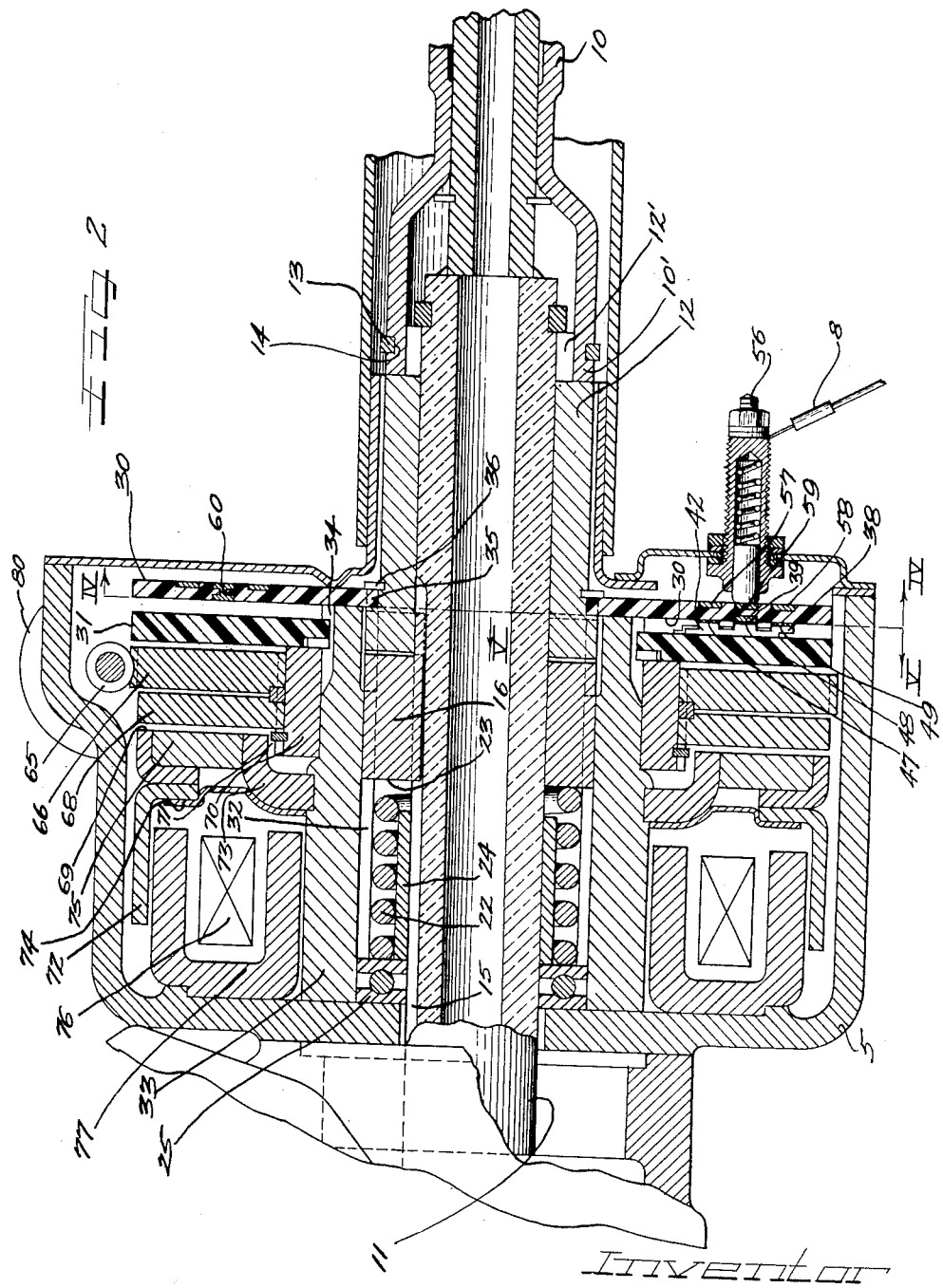

Sept 10, 1957 A. W. GARDES 2,806,101
ELECTRIC STEERING GEAR BOOSTER SWITCH
Filed Dec. 14, 1953 4 Sheets-Sheet 4
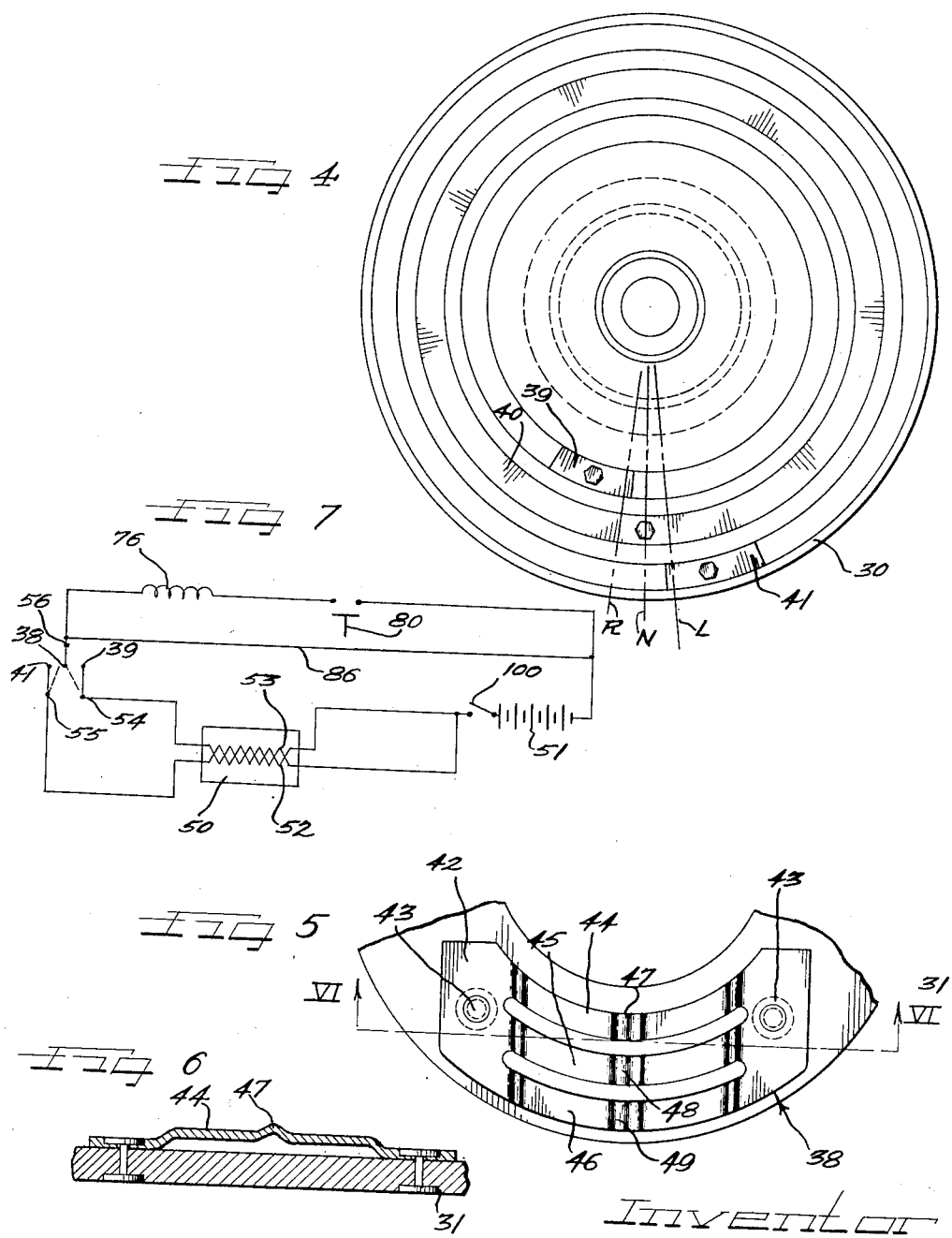
Inventor
Alfred W. Gardes United States Patent Office 2,806,101
Patented Sept. 10, 1957

2,806,101

ELECTRIC STEERING GEAR BOOSTER SWITCH

Alfred W. Gardes, Detroit, Mich., assignor to Houdaille Industries, Inc., Highland Park, Mich., a corporation of Michigan Application December 14, 1953, Serial No. 398,108

1 Claim. (Cl. 200—61.54)

The present invention relates to apparatus for providing power systems in the steering of vehicles, boats and similar mechanisms. More particularly, the invention relates to a novel and improved electrical power booster and a control system therefor which provides an automatic power system while requiring an absolute minimum of electrical current.

I am, of course, aware that power steering systems have been known and used in the prior art. However, to my knowledge there has been no completely satisfactory electrical power steering system heretofore developed. This failure has resulted mainly from the limitations of the ordinary automotive vehicle electrical system.

For example, the prior art electrical steering systems ordinarily require that the electric motor power source operate continuously, thereby unnecessarily draining the vehicle battery. A further disadvantage found in the prior electric systems in which the motor is a unidirectional, constantly running motor, is the need for relatively complex clutches and gearing, which elements unnecessarily increase the cost of the power steering installation. Still another defect often found in electrical systems of the prior art is the danger of a short circuit in the electric motor system causing undesired steering movement having a tendency to drive the car off the road in one direction or the other.

The apparatus of the present invention substantially eliminates all of the above mentioned prior art problems and has provided a relatively inexpensive unit having a minimum of gearing and a maximum of driving safety. As will be illustrated below, inadvertent short circuits or other similar electrical mishaps can in no way cause an undesired steering action.

The present apparatus comprises, generally, a manual steering system having a slight lost motion between the steering input shaft and the output shaft thereof. This lost motion is utilized to provide a torque responsive, direction sensitive, energization of a reversible electric motor. The lost motion is provided in either direction of relative rotation between the input and output shafts and a simplified dual switching structure is provided for energizing the electric motor in one or the other direction depending upon the direction of relative rotation between the steering input and output shafts.

Rotation of the electric motor will not in and of itself cause an electric booster action on the steering output shaft. Instead, a clutch structure is provided whereby the power applied to the steering output shaft is dependent upon the operation of an electrically actuated clutch between the motor and the steering output shaft. This clutch is constructed for energization only during such time as the forward and reverse switches above mentioned are actually in operation.

Jerky operation of the motor and clutching units is also eliminated through the provision of a speed sensing switch in series with the clutch actuator and connected to sense the speed of rotation of the electric motor. Thus, when the electric motor has been started up in response to energization through the steering switches the clutch which connects the electric motor to the steering output shaft can in no way be actuated to provide a power drive until the electric motor has reached its operating speed at which time the clutch connects the motor to the steering output shaft. At the same time, energization of the motor through means other than the steering switches, such as for example through an inadvertent short circuit, can in no way effect the booster drive since the clutch will not be energized and operation of the motor per se will not result in a steering effort.

It is therefore an object of the present invention to provide an electrical power steering system in which the electric power motor is in operation only during the time the power steering effort is required.

Another object of the present invention is to provide a novel power steering system utilizing an electrical circuit rendering inadvertent power steering operation impossible.

Still another object of the present invention is to provide an electrical power steering system having an absolute minimum of operative parts.

Another object of the present invention is to provide an electrical power steering system utilizing a reversible electric motor controlled by means of a novel steering shaft control switch.

Yet another object of the present invention is to provide an electrical power steering booster utilizing an electric motor which is in operation only during the time a steering effort is required and in which the steering effort provided by the electric motor is utilized only after the electric motor has reached a predetermined smooth operating speed.

Another object of the present invention is to provide a power steering system utilizing a smooth, non-contacting magnetic clutch whereby all clutch grabbing is eliminated.

Still another object of the present invention is to provide a power steering booster mechanism utilizing a minimum of space and requiring no hydraulic pump connections or other external mechanical sources of power.

A feature of the present invention is an electrical magnetic clutch which provides a slightly slipping power transmission at all times.

Another feature of the present invention is a novel electric motor actuating switch responsive to relative rotation between steering input and output shafts to actuate an electric motor.

A further feature of the present invention is the provision of speed sensing means in association with the electric motor providing the power steering effort and arranged in series with a drive clutch whereby the electric motor is not clutched into the steering system until it has attained a working speed.

Still other and further objects of the present invention will at once become apparent to those skilled in the art from a consideration of the attached sheets of drawings wherein several embodiments of the present invention are shown by way of illustration only and wherein:

Figure 1 is an end elevation view of the power steering apparatus of the present invention;

Figure 2 is a side elevational view of the power steering apparatus taken along the line II—II of Figure 1;

Figure 3 is an enlarged elevational view showing the torque responsive lost motion connection utilized in the present invention;

Figure 4 is an end elevational view of the novel control switch contacts of the present invention taken along the line IV—IV of Figure 2;

Figure 5 is an end elevational view taken along the line V—V of Figure 2 and showing further switch elements utilized in the present invention;

Figure 6 is a cross-sectional view taken along the line

VI—VI of Figure 5 and further illustrating the construction of the novel switch contacts of the present invention;

Figure 7 is an electrical schematic diagram illustrating a preferred circuit for use with the present invention;

Figure 8 is a modified form of lost motion control switch structure according to the concepts of the present invention;

Figure 9 is a further modification of the control switch herein disclosed; and

Figure 10 is a cross-sectional view of the modified switch structure shown in Figure 9 and taken along the line X—X of that figure.

As shown on the drawings:

Since steering gear drives, both manual and of the power booster type, have been long known in the art, and since the running gear of the vehicle and the wheel structure for the vehicle and the steering wheel arrangement for the manual operation thereof are also well known and form no portion of the present invention, the drawings herewith attached are limited to an illustration of the power booster apparatus and its relationship to the steering column, rather than the entire steering apparatus. It will thus be understood that the tubular steering shaft 10 is provided with a conventional steering wheel (not shown) for causing the manual rotation thereof and the shaft 11 is directly connected to a worm or other similar conventional gear reduction means (not shown) for actuating a conventional automotive running gear or other steering apparatus. Since, as was noted above, these conventional items form no part of the present invention, their illustration has been omitted.

The apparatus comprising the present invention, may be clearly understood from a consideration of Figures 1 through 6. As illustrated in Figure 2, the steering wheel shaft 10 is positively dog-clutched to a rotatable drive sleeve 12 by means of conventional, square, clutch teeth 10' and 12' respectively. The shaft 10 and the sleeve 12 are maintained in axially fixed relationship by means of a conventional retainer ring 13 which cooperates with groove 14 in the clutch members 10' and with a similar groove in the clutch members 12'.

A steering output shaft 11 which is, as above described, rotatably fixed to a conventional steering output worm is provided with splines 15 by which a driven sleeve 16 is rotatably secured thereto. Rotation is imparted from the steering wheel shaft 10 to the steering output shaft 11 through the sleeves 12 and 16 secured for rotation with the shafts 10 and 11 respectively by means of a cam type torque responsive coupling arrangement.

The cam coupling between the sleeves 12 and 16 comprises cooperating inclined surfaces 18 and 19, 20 and 21. The sleeve 16 is slidably mounted to permit movement axially relative to the sleeve 12 against the biasing force applied by the spring 22 which is in turn maintained in position against the end 23 of the sleeve 16 by means of a sleeve guide 24 and a friction thrust bearing 25.

The spring 22 provides a substantial force urging the sleeves 12 and 16 into contact with each other.

It will be clear, therefore, that relative rotation between the sleeves 12 and 16 may be accomplished only through the separation of the sleeves 12 and 16 against the force of the spring 22 in the manner shown in Figure 3 wherein rotation of the sleeve 12 in response to rotation of the steering shaft 10 has caused the surfaces 20 and 21 to contact each other forcing the sleeve 16 toward the left. As may be seen from Figure 3, the movement of the sleeve 16 toward the left permits relative rotation between the sleeves 12 and 16 to the extent indicated by the dimension A, which represents the distance the land 26 has moved transversely from the associated groove bottom 27.

It will thus be apparent that the relative rotation between the sleeves 12 and 16 will depend upon the torque transmitted between them and that this torque is equal to the torque transmitted from the steering shaft 10 to the outlet shaft 11. Thus, when a steering load is applied to the shaft 11, by resistance of the wheels to turning, a torque is necessary to cause the wheels to turn. This torque is very great when the vehicle is stopped, such as when parking, but is relatively slight when the vehicle is in motion.

The apparatus of the present invention is constructed to provide a relative rotation between the sleeves 12 and 16 only after a predetermined torque value is reached, thereby providing a direct drive between the sleeves 12 and 16 at all steering loads below the predetermined amount necessary to cause relative rotation as shown in Figure 3. It has been found in practice that a spring which prevents relative rotation between the sleeves 12 and 16 up to a point at which the torque requirement is 6 foot pounds, is very satisfactory. It is to be understood, however, that the spring 22 can be modified to permit relative rotation between the sleeves 12 and 16 at different torque loadings if desired.

The relative rotation between the sleeves 12 and 16 is utilized as a control mechanism for actuating the power booster of the present invention. Thus, at points above the 6 foot pound torque limit, i. e., when more than 6 foot pounds torque at the shaft 10 are required to cause turning movement at the output shaft 11, a relative rotation between the sleeves 12 and 16 will occur and this relative rotation is utilized to provide control to initiate actuation of a power booster which will relieve the shaft 10 of any further torque requirements.

The control above mentioned is provided in the embodiment of the present invention shown in Figures 1–6 in the form of a pair of disks 30 and 31 which are positioned in spaced face to face relationship and are secured for rotation with the sleeves 12 and 16 respectively. As may be seen clearly from Figure 2, the sleeve 16, which is splined at 15 to the shaft 11, is also splined to cooperate with the splines 32 on the power sleeve 33. The disk 31 is likewise splined to the sleeve 33 through spline 34. Thus, the disk 31, the power sleeve 33, the sleeve 16 and the shaft 11 all rotate in unison.

The disk 30, on the other hand, is non-rotatably secured to the sleeve 12 by means of a splined connection 35 and a retaining ring 36. Accordingly, the disk 30 will rotate simultaneously with the sleeve 12 and hence with the steering shaft 10.

As a result of the above construction, the disks 30 and 31 will rotate in unison as long as the torque transmitted between the shafts 10 and 11 is below the predetermined 6 foot pound limit above described. However, upon the application of a torque requirement exceeding the 6 pound limit, rotation will occur between the sleeves 12 and 16 as indicated in Figure 3, and hence a relative rotation will occur betwen the disks 30 and 31 to the same angular extent.

The relative rotation between the disks 30 and 31 is utilized as a control by providing a contact 38 on the disk 31 and related, cooperating, contacts 39, 40 and 41 on the face 30a of the disk 30 which faces the contact 38. The contact 38 comprises a plate 42 which is rigidly secured to the disk 30 by means of rivets or similar fastenings means 43. Flexible contacting leaves 44, 45 and 46 are provided having knife edge, raised, contacting dimples 47, 48 and 49 respectively. While the dimples 47, 48 and 49 are shown to be separate from each other to increase the flexibility thereof, it is to be understood that the elements 44, 45 and 46 may be a single spring plate if so desired. It is preferred, however, that three separate spring plates 44, 45 and 46 be provided so that a maximum of resiliency is obtained.

The dimples 47, 48 and 49 are electrically connected together at their ends and cooperate with the contacts 39, 40 and 41 respectively to provide a right and left control of a direct current series wound reversible electric motor 50. Thus, a source 51 of direct current electrical energy is supplied in parallel to a right hand motor field coil 52 and a left hand motor field coil 53. Leads from the right and left coils respectively are secured to spring biased brushes 54 and 55 respectively and a connection ultimately leading to ground is connected to the spring biased brush 56.

The brushes 54, 55 and 56 are resiliently maintained in electrical contact with the concentric slip rings 57, 58 and 59 respectively, embedded in the dielectric material of the disk 30. The concentric rings 57, 58 and 59 are electrically connected to the contacts 39, 41 and 40 by means of connecting pins which pass completely through the disk 30, for example, as shown at 60. Thus, the contacts 39, 40 and 41 will be in electrical contact with the contactors or brushes 54, 56 and 55 at all times, independently of the relative rotational position of the disk 30 relative to the fixed steering column housing 5 upon which the contactors 54, 55 and 56 are securely mounted.

In view of the segmental nature of the contacts 39 and 41, as viewed in Figure 4, it is impossible for the contacting dimples 47, 48 and 49 mounted on the disk 31 to contact more than two of the contacts 39, 40 and 41. Thus, as viewed in Figure 4, when the disk 30 is rotated relative to the disk 31 in a counterclockwise direction, indicating a right hand steering torque in excess of 6 foot pounds, the dimples 47 and 48 will contact the contacts 39 and 40 respectively, thereby energizing the right hand motor coil 52, but the contact 49 will be in contact with the dielectric portion of the disk 30. This position is shown at R in Figure 4 wherein the line denoted R indicates the contacting position of the dimples 47, 48 and 49.

In the situation where there is no relative rotation between the disks 30 and 31, the contacting dimples 47, 48 and 49 will lie along the line indicated N in Figure 4 and there will, obviously, be no electrical contact made between any of the contacts 39, 40 and 41.

On the other hand, upon clockwise rotation of the disk 30 relative to the disk 31, which would indicate a left hand turn requiring a torque greater than 6 pounds, the contacting dimples 47, 48 and 49 would align themselves along the line marked L in Figure 4, thereby providing an electrical contact between the contacts 40 and 41 to energize the left hand motor coil 53 thereby causing the motor 50 to rotate in a counter-clockwise direction which is translated into a left hand turning motion at the shaft 11 in a manner to be described below.

It will thus be apparent that rotation of the shaft 19 relative to the shaft 11 to cause turning movement in either direction will, when the torque required to rotate shaft 11 is greater than 6 pounds, cause a relative rotation between the disks 30 and 31, thereby energizing the coils 52 or 53 respectively to cause right hand or left hand rotation of the motor 50.

The motor 50 is connected to drive the shaft 11 either in the right hand or the left hand direction in the manner shown in Figures 1 and 2. There, the motor 50 is shown connected to a worm gear 65 which is in turn meshed with the worm wheel 66. The worm 65 is of conventional slightly reversible construction and has a pitch such that right hand rotation, or clockwise rotation as viewed in Figure 2 of the worm 65 will cause rotation of the gear 66 in a direction tending to turn the vehicle steering toward the right.

The worm wheel 66 is fixed to sleeve 70 which is in turn rotatably mounted relative to the power sleeve 33. Thus, power input from the motor worm 65 to the gear 66 is not directly connected to the output shaft 11. In order that rotational torque imparted to the gear 66 by the worm 65 be transferred to the power input sleeve 33 and thence to the shaft 11, it is necessary that the gear 66 or sleeve 70 be clutched to the sleeve 33. In the present invention, the clutch utilized is magnetic and comprises a pair of clutch members 68 and 69 secured for rotation respectively with sleeves 70 and 33. The clutch face 68 is slidable relative to the sleeve 70 but its axial movement is limited by a retainer 71 so that the face 68 may under no circumstances contact the surface 69.

The clutch face 69 is made up of annular steel rings 72 and 73 which are maintained in fixed annular relationship relative to each other by means of a seal 74 and an annular support ring 75, both of which are manufactured of low permeability materials such that magnetic lines of flux will not pass through them under ordinary circumstances to any greater extent than air.

The clutch faces 68 and 69 are urged toward each other into clutching relationship by the magnetic flux generated by an annular clutch coil 76 which is securely mounted within the annular steel channel 77 rigidly secured to the housing 5. Upon energization of the coil 76 a magnetic flux path is set up around the coil 76 which follows the path of the metal indicated above, from the channel 77, through the ring 72 to the clutch plate 68, the ring 73, the sleeve 33 and back to the channel 77. While the magnetic lines, of course, will cause the clutch members 68 and 69 to move as close as possible together, and will cause the transmission of a considerable amount of torque when the two clutch faces are in close proximity, nevertheless in view of the failure of the clutch faces 68 and 69 actually to touch each other, no abrupt engagement or binding action is possible.

It is to be understood, however, that in some installations, jerkiness may not be an important factor in the steering system and, therefore, it is contemplated that the retainer 71 may be eliminated if desired to permit the maximum torque transmission which results from a direct positive contact between the clutch member 66 and the rings 73 and 72 upon energization of coil 76.

In order to prevent the possibility of an accidental ground in the motor 50, in one direction of rotation or the other, with an automatic impartation of that rotation to the steering gear of the vehicle and hence with a disastrous undesired steering movement to the right or left, the coil 76 is connected electrically as shown in Figure 7. There, it may be seen that coil 76 is connected in series with the control switch brush 56, which is normally not electrically connected to the electric motor 50. Thus, should the motor 50 become inadvertently grounded through means other than the control switch, the coil 76 would not be energized and hence the motor would rotate the gear wheel 66 freely without causing any rotation of the shaft 11.

Likewise, an accidental grounding of the coil 76 at any point between the battery 51 and the brush 56, will not cause inactivation of the steering or an inadvertent power steering thereof. In this latter case, manual steering may still be carried out since the clutch 76 will not be energized.

In order to eliminate any possibility whatever of an erratic operation of the electric motor upon its initial starting in either direction and in order to permit it to reach a relatively high speed of rotation before the steering load is applied to it, a speed responsive switch 80 is provided. The switch 80 is preferably mounted on extension of the motor shaft 50a which shaft extends substantially in the vertical direction. While the switch 80 may, of course, be of any conventional speed responsive type, a mercury centrifugally actuated switch is herein shown.

As may be seen from Figure 1, a plurality of radially extending vanes 82 are connected for rotation with the shaft 50a. A pool of mercury is provided in the bottom of a cup-shaped housing 83 constructed of a dielectric material and carrying a pair of annular contacts 84 and 85 near the upper portion thereof. In normal steering operation, wherein the steering loads are less than the predetermined 6 foot pounds torque, the motor 50 will, of course, be at rest and the shaft 50a will be stationary. However, upon the energization of the motor 50, the shaft 50a will pick up speed, simultaneously driving the gear wheel 66 freely on the torque sleeve 33. As soon as the motor 50 reaches a predetermined, satisfactory, operating speed, the vanes 82 will cause the mercury within the housing 83 to be centrifugally thrown to the outside wall of the housing and upwardly therealong. At a predetermined speed the mercury will bridge the contacts 84 and 85 electrically closing the circuit, thereby connecting the clutch 76 to the electric source 51. As soon as the clutch 76 is thus connected to the source 51, the torque supplied by the motor 50 will be transmitted to the power sleeve 33 and thence to the shaft 11 to provide a power assist to the operator of the vehicle.

By providing the speed responsive switch it is possible to utilize an electric motor of a lower torque. This is true since the motor is not required to supply a steering torque from a dead rest position and, is, instead, merely required to supply a torque after the motor has reached a satisfactory operating speed. This arrangement permits a substantial reduction in the power rating required of the electric motor and thus in the cost of the electric motor necessary.

As will be noted from Figure 7 a by-pass conductor 86 is required in parallel with the coil 76 and the speed responsive switch 80 in order to permit energization of the motor prior to closing of the clutch coil circuit by the switch 80. After the switch 80 has been closed by a build up of speed in the motor 50, the current will flow through the clutch coil 76 as well as the by-pass 86. Of course, it may be necessary, in order to provide a maximum current flow in the clutch coil 76, to provide a resistance in the by-pass line 86. Such a modification is, of course, within the scope of the present invention, as is the provision of a relay connected to the switch 80 and which would automatically open the by-pass 86 upon closure of the switch 80, thereby requiring all current to pass through the clutch coil 76 after the electric motor 50 has reached a predetermined operating speed.

While the above described apparatus has been found very satisfactory, several modifications may be utilized effectively in controlling the electric motor 50. Modified forms of the control switch 38, are shown in Figures 8, 9 and 10.

In the first modification, shown in Figure 8, the shafts 10 and 11 are connected respectively to the sleeves 12a and 16a. The sleeve 16a is slidably mounted on the shaft 11 to permit reciprocation therealong but to require simultaneous angular movement between the sleeve 16a and the shaft 11. A spring 22a is mounted around the shaft 11 and in abutment with a nut 90 threaded on the shaft 11. A lock nut 91 may be provided if desired in order to permit a secure adjustment of the position of the abutment nut 90 and hence the torque adjustment of the wedge sleeves 12a and 16a.

As in the first modification shown in Figures 1 through 7, relative rotation of the sleeves 12a and 16a, resulting from the transmission of torque in excess of predetermined value between the shafts 10 and 11, will cause energization of the electric motor 50 in the right hand or left hand direction. This energization is accomplished by means of a contact 40a which is mounted between contacts 41a and 39a for a wiping contact therewith upon axial and rotational movement relative thereto resulting from relative rotation between sleeves 12a and 16a. The contacts 39a, 41a and 40a are electrically connected to the respective slip rings 57a, 58a, and 59a. These slip rings are in turn electrically connected to the clutch coil 76 and motor field coils 52 and 53 in the manner above described relative to the embodiment shown in Figures 1 through 7, by means of the brushes 54a, 55a, and 56a.

The motor circuit, including the clutch coil 76 and the speed responsive switch 80 may be identical in the embodiment shown in Figure 8 to that shown in Figures 1 through 7 and this combined portion of the apparatus is merely shown in block form at 92.

A further modified form of control switch is shown in Figures 9 and 10 wherein the shafts 10 and 11 are connected through a spring-centered positive clutch structure. There, the shaft 10 is provided with a positive dog clutch 12b which cooperates with an intermeshing positive dog clutch sleeve 16b. The sleeves 12b and 16b are secured for rotation with the respective shafts 10 and 11 and no axial movement relative to the shafts 10 and 11 is provided.

Normal drive between the shafts 10 and 11 is provided through the springs 95 which are positioned between adjacent dog teeth 96 on the sleeve 12b and 97 on the sleeve 16b. Parallel abutment type contacts 39b and 41b are securely mounted to the sleeve 12b as shown in Figures 9 and 10 and are electrically connected to the slip rings 57b and 58b respectively. The sleeve 16b is electrically connected to a brush 56b and is, preferably, mounted on a dielectric hub 98 so that the current flowing from the brush 56b to the contact 40b will not be short circuited to the shaft 11 and from thence to ground.

The slip rings 57b and 58b are connected to the motor fields 52 and 53 by means of the brushes 54b and 55b respectively and the motor 50 will therefore be energized in substantially the same manner as above described relative to the modifications shown in Figures 1 through 7, and Figure 8. In the embodiment shown in the present figures, however, the steering connection is somewhat more resilient, since no direct metal to metal torque contact is provided between the sleeves 12b and 16b until after the relative rotation has occurred between the two sleeves. Thus, the springs 95 are preferably relatively stiff to prevent any feeling of looseness and it is preferred that a spring deflection of approximately 1/16 of an inch be sufficient to cause contact between the contact 97 and one of the contacts 39b or 41b.

The operation of the steering apparatus shown in the three embodiments above discussed is substantially identical. In each case, a rotation of the steering shaft by turning of the steering wheel will cause an annular drive through the steering output shaft 11 to the steering gear box until such time as the torque required to rotate the shaft 11 exceeds a predetermined value, such as for example, 6 foot pounds.

As soon as the predetermined torque is required to cause the rotation of the shaft 11, a relative rotation will occur between the shafts 10 and 11. This relative rotation will cause an off center relationship to occur in the electrical switch, thereby energizing the electric motor 50 in one direction or the other. As soon as the electric motor has reached a satisfactory operating speed, which takes a negligible amount of time due to the fact that the motor is unloaded during this initial speed build-up, the motor clutch is engaged, causing the motor drive to impart rotation to the shaft 11 in the same direction in which the shaft 10 is being rotated. Thus, the electric motor 50 supplies all of the torque in excess of the 6 ft. pounds required to actuate the control switch and all of the steering operations requiring less than 6 ft. pounds torque will be performed manually without power.

Provision of the magnetic type clutch and the series wound direct current motor has also provided an extremely rapidly acting steering unit capable of handling rapid reverse or S curves without difficulty. In negotiating such curves it is necessary that the power be substantially instantaneously cut off and reversed and that no lag or resistance to reverse steering be had. Although prior art hydraulic systems have not met these requirements, the present system has performed these difficult maneuvers with complete satisfaction.

In the present system, when a rapid reverse steering actuation is needed, the movement of the steering wheel in the new direction will immediately deenergize the clutch coil 76 and the motor 50. The motor 50 will thus immediately be disconnected from the shaft 11 and a manual reversing movement may immediately be initiated without opposition from the inertia of the power system. If more than 6 foot pounds torque are required to turn in the reverse direction, the switch 38 will be actuated in reverse and the motor 50 immediately energized in the new direction. Upon increase of the motor speed the speed responsive switch 80 will close and the clutch coil 76 reenergized to apply power to the shaft 11 in the reverse direction.

It has been found that the series wound motor 50 will reverse almost instantaneously and will achieve its operating speed in the new direction with negligible time lag. Further, if the motor 50 were, in some case such as during a very sharp turn, found to turn the vehicle too slowly, the motor will not prevent the manual steering from operating to cause a faster turn. In such an instance, the application of manual force will cause the steering shaft 11 to tend to rotate faster than the motor and the motor load will thus be greatly reduced. Since the motor 50 is series wound, reduction of the steering load will cause a rapid increase in its speed. Thus, the motor 50 can never operate to resist rapid steering action, whether the vehicle is steered in a reverse curve or an exceedingly sharp high speed turn.

In view of the fact that the electric motor of the present steering system is in operation only during a fraction of the driving time, a very small drain is placed on the battery. Further, in view of the electrical connections provided, it is impossible for an accidental energization of the electric motor to cause an undesired steering movement of the vehicle and therefore, it is impossible for the vehicle to be forced out of control by short circuits or other electrical failures.

If desired, a manual switch 100 may be provided between the electrical source 51 and the electric motor 50 thus permitting the entire power steering circuit to be opened at will. If, an accidental ground should occur thereby causing inadvertent energization of the electric motor 50, or should it be desired that the power steering be eliminated for some other reason, the switch 100 may be opened to prevent any operation of the motor 50. Likewise, in the event of a failure of the control switch such as to provide erratic operation, the manual switch 100 may be opened until the necessary repairs can be made.

It will thus be seen that I have provided a novel and extremely efficient electric power steering booster which will provide all steering torque requirements in excess of a predetermined nominal amount, and which is extremely simple and impossible to damage to the point of inoperability. While various modifications have been illustrated, it is of course to be understood that other changes may be made without departing from the scope of the novel concepts of the present invention and it is therefore my intention to limit the invention only by the scope of the appended claim.

I claim as my invention:

A power steering control comprising a first steering wheel shaft and a second steering output shaft, a first disk secured to said steering shaft for rotation therewith and a second disk secured to said second shaft for rotation therewith, a contact bar on said second disk and having a plurality of electrically connected contacts lying on a single radial line thereof, first, second and third contacts positioned on the face of said first disk facing said contact bar, said first and third contacts lying in different radial lines on the face of said first disk and the second contact extending separate from but peripherally overlapping said first and third contacts whereby said contact bar will engage said second contact at all times and will selectively engage said first or said third contacts depending upon the direction of relative rotation between said shafts, means permitting relative rotation between said shafts upon the transmission of a torque in excess of a predetermined steering torque, and third, fourth and fifth concentrically mounted slip ring contacts on the face of said first disk remote from said contact bar, said fourth, fifth and sixth contacts being electrically connected to said first, second and third contacts respectively and further being electrically connected through separate brushes to a power motor circuit.

References Cited in the file of this patent

UNITED STATES PATENTS

| | | |
|---|---|---|
| 2,267,114 | Lear et al. | Dec. 23, 1941 |
| 2,303,638 | Helin | Dec. 1, 1942 |
| 2,400,018 | Olah | May 7, 1946 |
| 2,550,868 | Russel et al. | May 1, 1951 |
| 2,583,407 | Binder | Jan. 22, 1952 |
| 2,587,377 | Penrose | Feb. 26, 1952 |

FOREIGN PATENTS

| | | |
|---|---|---|
| 401,318 | Italy | Jan. 15, 1943 |
| 993,964 | France | Nov. 9, 1951 |